Aug. 4, 1970　　　　　　　　H. W. MOORE　　　　　3,522,960
STRUCTURAL TUBING JUNCTURE
Filed Oct. 26, 1967　　　　　　　　　　　　　　2 Sheets-Sheet 2
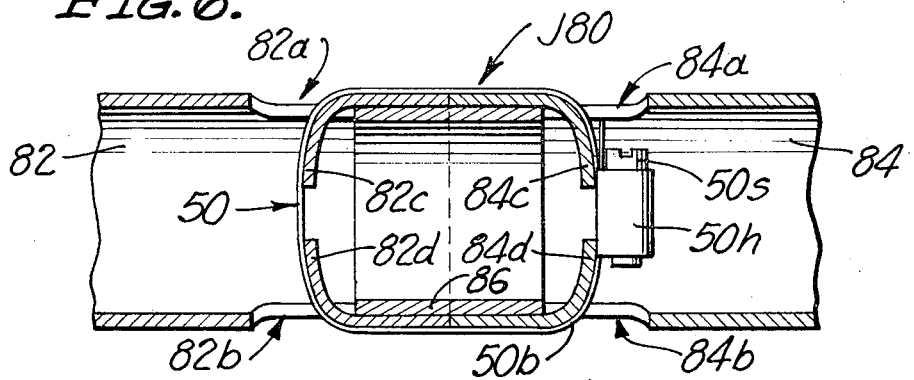
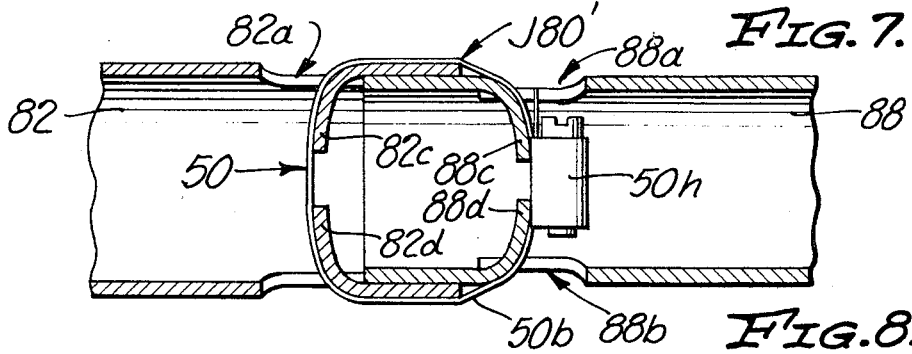
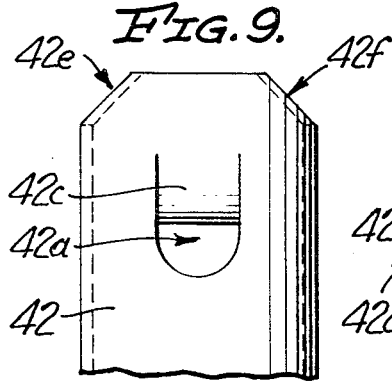
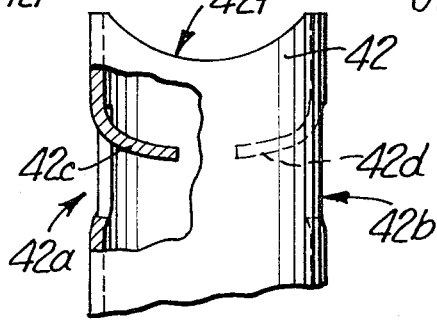
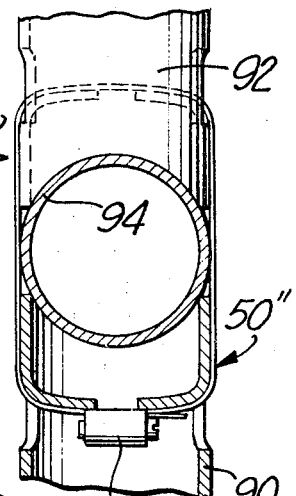
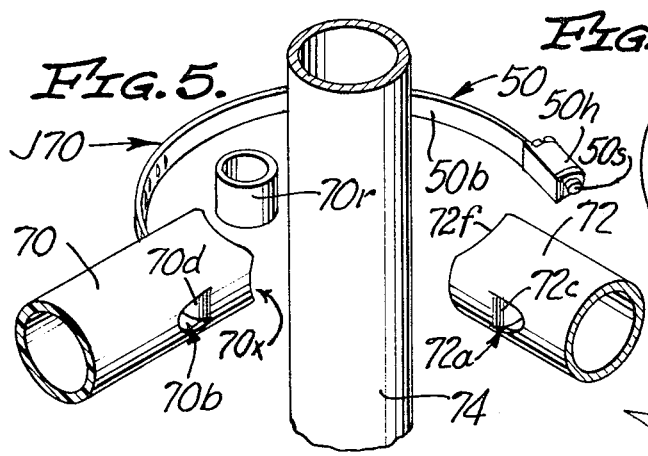
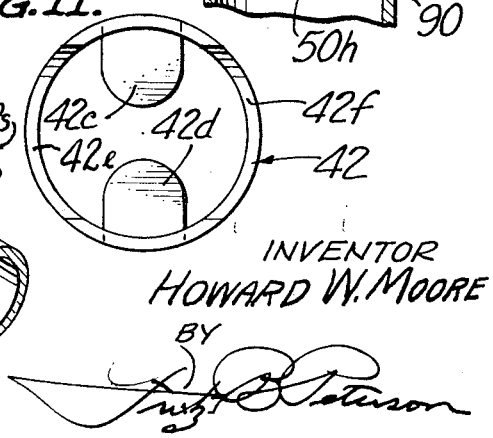
INVENTOR
HOWARD W. MOORE
BY United States Patent Office 3,522,960
Patented Aug. 4, 1970

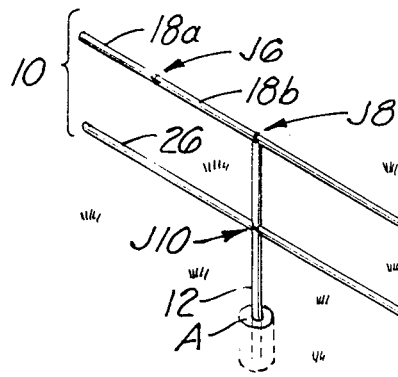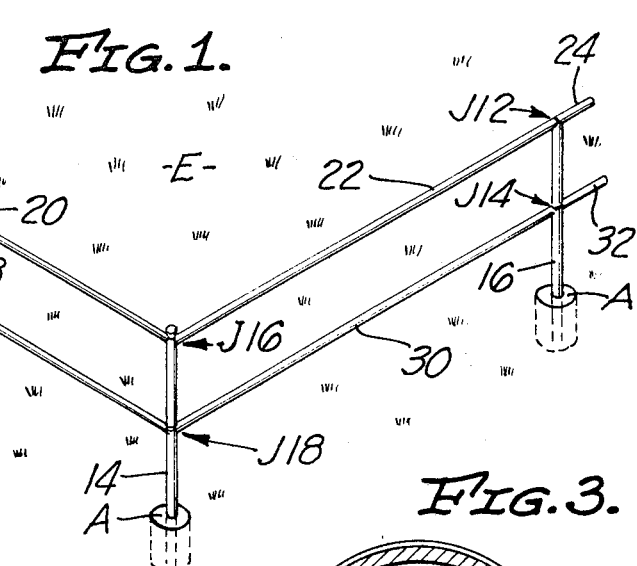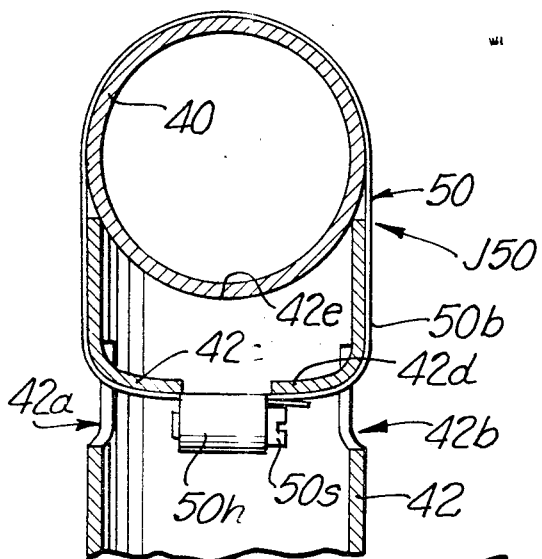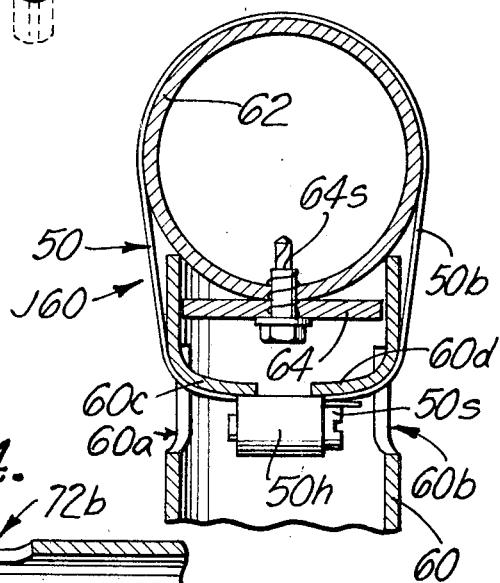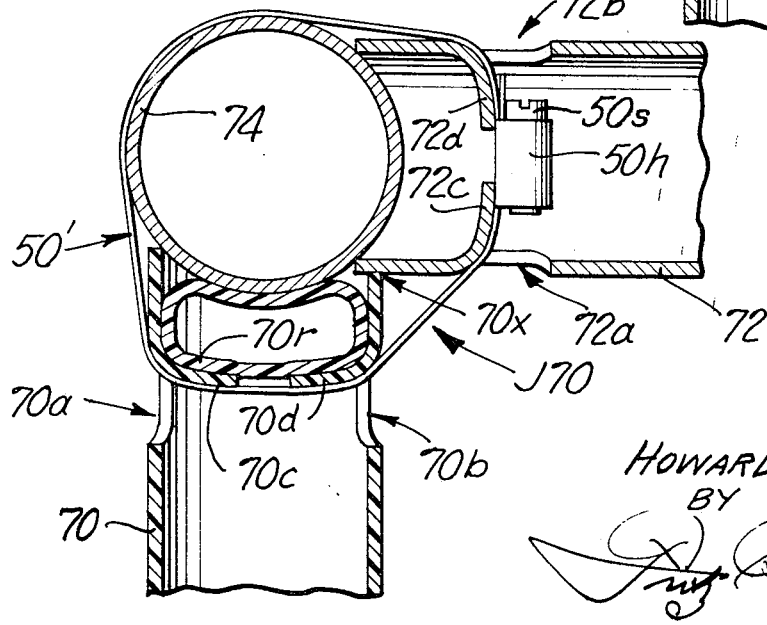

3,522,960
STRUCTURAL TUBING JUNCTURE
Howard W. Moore, San Jacinto, Calif., assignor of twenty percent to Fritz B. Peterson and twenty percent to Wallace M. Todd, both of San Jacinto, Calif., five percent to William D. Sellers, Pasadena, Calif., and five percent to George A. Brace, Altadena, Calif.
Filed Oct. 26, 1967, Ser. No. 678,366
Int. Cl. F16b 7/04
U.S. Cl. 287—54
13 Claims

ABSTRACT OF THE DISCLOSURE

A structural tubing juncture comprising in combination with two or more sections of tubing to be joined in a demountable structural joint of any of several configurations such as end-to-end, end-to-intermediate butting, and corner-post, a strong tensionable flexible band device disposed through inwardly lanced opposed apertures in at least a first one of the tubing sections and disposed in flat tensioned engagement with inwardly-extending curved tongues produced in the latter section by the lancing, the band device further extending about a portion of at least another of the tubing sections and drawing the latter section into secure engagement with the first tubing section. End portions of the band of the band device are engaged by tensioning means which are self-locking and reversible in operation to permit release of the first tubing section one from the other or others, and further the band device is such as to maintain band tension following formation of a tubing juncture.

---

In the prior art are found a variety of demountable tubing joint structures, including the well-known threaded plumbing junctures wherein threaded ends of tubing or pipe are connected to other plumbing fixtures or elements such as elbows, trees, couplings, etc. Such plumbing connections or junctures are usually required to be fluid-tight, and as a consequence involve expensive threading and complex structures if they are to be readily disassemblable. In the field of purely structural junctures wherein only structural load-bearing connection is required and lack of fluid-tightness is of no consequence, and to which field of tubing junctures the present invention pertains, it has been previously proposed to unite tubing elements by U-clamps and by pin-bolts and other rigid connecters. These are exemplified by the structures disclosed in U.S. Pats. Nos. 1,627,177; 2,046,585; 2,557,-766; and 2,876,027. Those prior-art structural connections or junctures, while in most cases structurally strong, are characterized by one or more of the following undesirable features or characteristics, namely, expensive to produce, having protruding and unsightly bolt ends, requiring excessively time-consuming nut-and-bolt fitting and tightening, and comprising complicated or complex stuctures requiring an undue amount of careful machining and assembly operations.

The present invention obviates substantially all of those undesirable characteristics of the noted prior-art modes and means of providing structural tubing junctures, by simple means and steps including producing band-receiving openings in tubing members by lancing and concurrently - producing band - supporting inwardly-extending curved tongues, and by using strong, flat easily assembled and disassembled tensionable band devices which when tensioned firmly hold tubing sections united in relatively smooth, esthetically pleasing and structurally rigid and strong structural joints or junctures. Such junctures are improved, in some cases, by die-removal of portions of an end of a tubing section to improve the fitting of tubing sections. The joints may be used in uniting tubing sections into stockades or corrals, fences, barricades, and the like, against any portion of which animals may brush without likelihood of harm or injury, and which structures are easily assembled, easily disassembled, and in disassembled form are economically transported. Other meritorious features of the novel junctures will hereinafter be made apparent or will be explained.

The foregoing brief description of the invention makes it apparent that it is a principal object of the invention to provide general improvements in structural tubing junctures.

Another object is to provide means whereby inexpensive easily assembled structural joints or junctures of tubing sections can be made.

Another object is to provide an inexpensive structural tubing juncture of relatively smooth exterior configuration, which is esthetically pleasing as well as structurally strong.

Another object of the invention is to provide an exceptionally strong easily assembled and disassembled structural tubing juncture.

Other objects and advantages of the present invention will hereinafter be set out or made apparent in the appended claims and following description of preferred exemplary structural tubing junctures of several configurations illustrated in the accompanying drawings froming a part of this specification, and in which drawings:

FIG. 1 is a pictorial view of a fence formed principally of tubing and comprising exemplary structural tubing junctures according to the invention;

FIG. 2 is a sectional view of an exemplary structural tubing juncture formed according to principles of the invention an joining two tubing sections of equal diameters and disposed at right angles each to the other, and showing the nature of opposed lanced perforations or apertures in one section and showing a shaped end formed in and on one end of the lanced tubing section, and further showing how the sections are demountably held together by a flat tensioned band device according to the invention;

FIG. 3 is a view similar to FIG. 2 but depicting a juncture comprising tubing sections of differing diameters and further illustrating means for enhancing the stability and rigidity of the juncture;

FIG. 4 is a view similar to FIG. 2, but depicting the disposition of three tubing sections disposed at right angles, each to the others, and joined in a juncture formed according to a means and mode of the invention, and further illustrating employment of an adjunct means of the invention especially useful in forming tubing junctures comprising one or more tubing sections of so-called plastic tubing;

FIG. 5 is an exploded view showing in disassembled array the components of the structural tubing juncture depicted in section in FIG. 4;

FIG. 6 is a sectional view of an end-to-end structural tubing juncture comprising sections of tubing of equal diameters, according to the invention;

FIG. 7 is a view similar to FIG. 6, but illustrating end-to-end joining of sections of tubing of differing diameters according to the invention;

FIG. 8 is a plan view partly in section, of a juncture according to the invention, comprising an upright tubing section and first and second coaxial tubing sections extending away therefrom in substantially the same plane; and, FIGS. 9, 10 and 11 are views of an end portion of a tubing section, showing preferred exemplary shaping, lancing and curved-tongue formation of a section of tubing, in preparation for use in a structural tubing juncture according to the invention.

Referring first to FIG. 1, there is shown a simple fence comprising tubing sections joined into a unitary structure by tubing junctures according to the invention, the fence being denoted generally by the number 10, and being only exemplary of a wide variety of structures to which the present invention is directly applicable. The fence 10 comprises upright tubing sections 12, 14, and 16 each of which may be at its lower end removably disposed or anchored in a hole in a concrete or like anchor such as that labeled A, embedded in the earth E as indicated. Further comprised in the exemplary fence 10 are horizontal tubing sections 18a, 18b, 20, 22, 24, 26, 28, 30, and 32. An end-to-end tubing juncture J6 unites sections 18a and 18b into a unitary structure. Juncture J6 may be such as is depicted in section in FIG. 6, for example; or such as is shown in section in FIG. 7 in those instances in which the joined tubing sections are dimensioned to be telescoping. Tubing sections 18b and 20 are joined to upright section 12 at a juncture J8, as are tubing sections 26 and 28 at a juncture J10. In like manner, tubing sections 22 and 24 are structurally joined to upright section 16 at a juncture J12; and similarly sections 30 and 32 are joined to the same upright at a juncture J14. The fence forms a corner at upright tubing section 14, which serves as a corner post. At the corner post, upright tubing section 14 has joined thereto tubing sections 20 and 22 at a juncture J16; and also has sections 28 and 30 united thereto at a juncture J18. As is evident, tubing sections 18A–18b, 20, 22, and 24 serve as upper rails of the fence, and sections 26, 28, 30 and 32 serve as intermediate, or bottom, rails of the fence. The junctures are of physical constructions made evident in FIGS. 2–11 inclusive; and may be as illustrated in one or another of the latter figures, or may be of similar, but modified, construction, as will be presently made clearly evident in the following detailed description of the exemplary tubing junctures therein shown.

Referring now to FIG. 2, there is shown principally in section two pieces or sections of tubing 40 and 42 disposed at right angles and joined according to the invention to form a simple right-angle structural juncture. Therein an intermediate portion of the tubing section 40 is depicted as disposed perpendicular to the plane of the drawing, and an end portion of the tubing section 42 is disposed at right angles to section 40. Tubing section 42 has been lanced by die means and has been shaped at the end thereof by shearing, all as indicated in detail in FIGS. 9, 10, and 11, and the two tubing sections are held in structurally united condition by a means more fully explained hereinafter. Referring to the latter drawings, by lancing and preferably concurrent die-forming, first and second opposed apertures 42a and 42b are produced, with concurrent formation of first and second inwardly-extending curved tongues 42c and 42d which comprise material of the tubing wall that is inwardly displaced as indicated but which remains integral with and firmly supported by the tubing wall at the outer terminations of the tongues.

Continuing with reference to FIGS. 9, 10, and 11, opposite end portions of the tubing section 42 are removed, as by shearing or other suitable operation, to provide bevels as indicated at 42e and 42f in FIG. 9. The bevels are formed at regions displaced generally 90° from the regions of the apertures 42a, 42b, and the tongues 42c and 42d, as indicated. The lancing, tongue-shaping and end-beveling of the tubing section may be accomplished individually, or contemporaneously by specially formed and operated die means, as will be evident to those skilled in the mechanical arts. Referring again to FIG. 2, it will be noted that the bevel 42e at the end of tubing section 42 enables the latter to come into close, curved, and somewhat arcuate contact with the surface of upright tubing section 40. The same is true of the other bevel, 42e, (FIG. 11), which has been removed in the sectional view of FIG. 2. Thus tubing section 42, when disposed substantially at right angles to tubing section 40, engages the latter along two curved, spaced-apart lines of contact defined by the bevels. As will be noted, the beveling of the tubing section 42 produces an edge with a curvature of compound nature and such that good structural contact with section 40 is attained, as indicated in FIG. 2.

Tubing sections 40 and 42 are drawn into tight inter-engagement and held rigidly integrated into a stable juncture, by a band device 50 (see FIG. 5), which preferably is a strong stainless-steel tubing clamp of commercially-available form widely used for hose-clamping. Band device 50 comprises a long flexible flat band 50b one end of which is anchored to a head 50h in which is rotatably held a worm or screw 50s the thread of which is arranged to engage a complementary ladder formation or thread formed, as by perforations, along the free other end portion of the band portion 50b. The screw 50s comprises a head which is formed to receive a tool (e.g., a screwdriver bit) by means of which the screw may be rotated to tension or relieve the band 50b. Further, the band device 50 is selected of appropriate size whereby the head 50h may be inserted through either of the lanced openings 42a, 42b, and positioned within the interior of the lanced tubing end, as indicated in FIG. 2. The free end portion of band 50b is passed around the upright tubing 40 and the free end is passed through the other lanced aperture (42a as shown) and into engagement with screw 50s. Thereafter the band may be drawn up and strongly tensioned by rotation of the screw 50s, whereby to draw the tubing sections into strong frictional engagement and demountably unite the two sections 40 and 42 into a good structural juncture. As is made evident in FIG. 2, the inwardly-curved tongues 42c and 42d provide curved flat seats on which band 50b is supported and which seats prevent chafing or cutting of the band by any sharp edges of the tubing. Further the tongues concurrently provide a pair of large spaced-apart surfaces upon which the band bears and exerts forces in directions substantially opposite those in which it bears against tubing section 40. Thus both of the tubing sections present ideal curved seats or bearings for the flat inner face of the band, whereby the band device may be very highly tensioned without damage, to produce an extremely strong and durable joint. Further it should be noted that the juncture thus produced presents only substantially smooth surfaces to objects coming into contact with the exterior of the juncture, the head 50h of the band device being disposed inside a tubing section where it is out of the way of such objects and is protected. Further it should be noted that despite the juncture being very strong, and durable due to the self-locking feature of band device 50, the juncture is nevertheless susceptible of easy and rapid disassembly, since only reversed turning of the screw 50s is required for release of tension and separation of the ends of the band. The exterior smoothness of the juncture as a whole is enhanced by the inward lancing producing a slightly rounded outer corner edge, as will be understood by those skilled in the art. The flat band 50b, being under high tension, disposes itself in snug engagement with the surface of tubing section 40, and hence does not present any appreciable obstacle or disruption of the exposed surfaces at the juncture.

Many other types junctures according to the invention and utilizing lanced apertures and band devices 50 are obviously possible, and exemplary other such junctures are illustrated in FIG. 4 (two tubing sections joined at right angles to each other to an upright section), in FIGS. 6 and 7 (two tubing sections joined end to end, in two different styles), in FIG. 8 (two coaxial tubing sections joined to an upright section), and in FIG. 3 (a reinforced juncture formed with a tubing section of rigid insulation and an upright tubing section). Others, not illustrated, are within the purview of the invention, as will now be evident. The mentioned examples depicted in sectioned form in FIGS. 3, 4, 6, 7, and 8 will now be described in greater detail.

In FIG. 3, a tubing section 60 of rigid insulative material, such as of so-called "plastic" pipe, is joined to a tubing section 62 of other or similar material, with special supplementary means, the two being secured together by a band device 50. As indicated, section 60 is lanced to provide apertures 60a and 60b and inwardly-extending curved tongues 60c and 60d on which the band 50b of the band device is seated. To serve either or both of the functions of inhibiting either rotary or longitudinal slipping of the less-strong non-metallic material of section 60 on section 62, and of reinforcing the juncture and especially the beveled end of section 60, there is secured to section 62 a washer-like disc 64 which snugly fits within the end portion of section 60 as indicated. Disc 64 may be secured to section 62 in any suitable way, as, for example, by means of a self-tapping screw 64s. Following attachment of the disc to section 62, the beveled and lanced end of section 60 is run over the disc, and band device 50 is applied and tensioned by rotation of screw 50s. As will be evident, the juncture, J60, depicted in FIG. 3, illustrates the joining at right angles of tubing sections of differing diameters and of different materials. The use of insulation tubing sections is of value in certain applications; for example, in the construction of electrified fences, and in the construction of frames for temporary tent-like structures.

In FIG. 4 there is illustrated a juncture J70 in which three tubing sections 70, 72, and 74 are joined each at right angles to the others. While it is obvious that the spatial disposition of the sections may be otherwise, for convenience section 74 will be treated as an upright section, whereby sections 70 and 72 may, for example, serve as rails extending from a corner, similarly to the arrangement at juncture J18 in FIG. 1. Respective end portions of the sections 70 and 72 are lanced to provide opposed apertures and inwardly-extending tongues as illustrated, in a fashion and for reasons previously made evident. Further, to permit sections 70 and 72 to come together to form a good structural juncture, either or both is additionally cut away or "nibbled" where they come into contact. For example, as shown, tubing section 70 is cut away as indicated at 70x so as to fit snugly against the curved exterior surface of section 72. A flat band device 50', similar to band device 50 but longer, is passed through the apertures formed in sections 70 and 72, and around section 74 as shown, and is tensioned. The head 50h of the band device may be disposed in either of sections 70 and 72, and for convenience of access with a tool is shown within section 72. To reinforce the end of section 70, which is illustrated as being formed of insulation, a short length of tubing of that material, labeled 70r (see FIG. 5), is deformed and pressed into the end of that section, as indicated. Therein it serves as a very inexpensive and satisfactory means for aiding the end of the relatively less strong section 70 to withstand the stresses created when band device 50' is tensioned. Band device 50' may be exactly the same as band device 50 except as to length. As is known, band devices (tubing clamps) of that type are commercially available in a wide range of lengths, widths, and materials. In the juncture J70 illustrated in FIGS. 4 and 5 the action of the band device in integrating the tubing sections into a stable and easily demountable structural tubing juncture is the same or similar to that described in connection with FIG. 2. Also, the functions of the lanced perforations and inwardly-extending tongues formed adjacent the ends of sections 70 and 72 are as previously made evident. The juncture J70 illustrates the feasibility of joining two tubing sections of smaller diameter to a section of larger diameter such as an upright "post," either adjacent and end of the latter, or intermediate the ends thereof.

In FIG. 6 there is illustrated in section a structural tubing juncture J80 in which the abutting ends of coaxially disposed tubing sections 82 and 84 of equal diameter are joined. In this type of juncture, the ends of the tubing sections may optionally be beveled as well as lanced, but preferably the ends of the tubing sections are merely left square. Both sections are lanced to provide oppositely disposed apertures 82a, 82b and 84a, 84b, and opposed inwardly-extending tongues 82c, 82d and 84c, 84d, as indicated, for reception and seating of a band device 50. As an aid in forming the juncture and reinforcing it as well, a short sleeve 86 of strong tubing is disposed with an end in each of sections 82 and 84 and overlapping the abutting ends of the joined sections. Preferably the diametral dimensions are such as to provide a snug or sliding fit. After insertion of sleeve 86 and butting together the ends of sections 82 and 84, band device 50 is applied with the band thereof extending through the four lanced apertures and alongside the adjacent ends of the joined sections and with the head 50h disposed in either of the sections (in section 84 as shown). Tensioning of the band device forces the two sections into compressive engagement, as is made evident in the figure. Preferably the sleeve 86 is made to be as long as can be accommodated in the space between the pairs of lanced tongues; and if desired the sleeve may be made of heavier gauge than the tubing of the joined sections. Further, as is evident, the lanced openings or apertures may be made farther from the ends of the tubing sections than is indicated, and a longer sleeve 86 utilized, for obvious reasons.

In FIG. 7 is illustrated a structural tubing juncture J80' at which tubing sections 82 and 88 are joined. In this style of juncture the tubing sections are of different diameters and so selected as to be telescoping as indicated. Both tubing sections are lanced to provide opposite apertures and each of a pair of opposed curved tongues, in a manner and for reasons previously herein made evident. A band device 50 is applied through the apertures and tensioned with the head 50h disposed in one of the tubing sections as indicated. As is evident, the lancing is spatially effected to permit the end of the section 88 of smaller diameter to be forced inwardly into the end of the section of larger diameter and into compressive engagement with the tongues in the latter section, all as indicated. Due to the close engagement of the outside surface of the end of section 88 with the interior surface of the end of section 82, a rigid juncture is assured. In other respects, the lanced apertures, inwardly-extending tongues and band device 50 are labeled and function similarly to like portions or members of the previously described junctures J50, J60, J70, and J80.

In FIG. 8 there is depicted a style of structural tubing juncture, J90, according to the invention, useful in joining to an upright tubing section, first and second coaxially disposed but oppositely-extending tubing sections, the juncture being such as is utilized, for examples, at junctures J10 and J14 in the fence structure depicted in FIG. 1. Thus, in FIG. 8, coaxially disposed tubing sections 90 and 92 are joined to a tubing section 94 with the aid of a band device 50". The ends of tubing sections 90 and 92 are doubly lanced and beveled, exactly as was section 42 (FIG. 2), the band of device 50" is passed through the four lanced perforations, sections 90 and 92 are aligned as indicated, and the band device, positioned as indicated, is tensioned to draw the ends of sections 90 and 92 into compressive frictional engagement with the exterior surface of section 94, all to form the readily demountable but strong and stable juncture J90.

As has now been made evident by the preceding description, members such as the washer-and-screw (64, 64s) combination illustrated in FIG. 3, and/or the member 70r (FIG. 4), may be utilized as may be desired in junctures such as the described exemplary junctures J50, J70, and J90, and in other junctures according to the invention. Further, tubing of a variety of materials and of various wall thicknesses and diametral dimensions may be used. In each of the junctures the tensioned band device is protected against damage and aided in performing its intended functions by seating on the flat curved surfaces of the inwardly-extending tongues lanced from the tubing wall or walls. Due to use of the band device as described, the various junctures may optionally be permanent, due to the self-locking feature of the band device; and further they may, alternatively, be easily and quickly disassembled without detrimental effect on any of the components. Thus structures built of tubing sections joined according to the invention may be repeatedly assembled and further they may, alternatively, be easily and quickly simplest of tools. Further, the junctures are not unsightly, but are esthetically pleasing and in no way likely to cause damage to animals or articles brushing against them, in contrast to structural tubing joints in the prior art.

Herein the principles of, and exemplary means for practicing, the invention have been disclosed in detail. In the light of the disclosure of exemplary styles and structures according to the invention, modifications within the true spirit and scope of the invention will occur to others, both as to styles of junctures and uses of joined members; and accordingly it is not desired to limit the scope of the invention other than is required by the appended claims. As is evident, the tubing sections may be of any of a variety of materials or substances of which tubing is commonly manufactured (for examples, steel, brass, aluminum, stainless alloy), and the various sections may be of different materials. Further, a variety of materials and reinforcing member forms may be employed in augmenting rigidity and strength of the juncture according to the invention; for examples, members 64 of FIG. 3, member 70r of FIG. 4, and sleeve member 86 of FIG. 6, may be of shapes and materials other than the metal and plastic (synthetic resinous) materials shown. In the interest of brevity, preferred exemplary materials only have been disclosed.

I claim:

1. A structural tubing juncture comprising:
    a first tubing section having first and second ends;
    a second tubing section having first and second ends and having adjacent said first end first and second inwardly lanced and displaced portions forming inwardly-extending integral curved-tongues the inward displacement of which provides respective first and second apertures in said second tubing section adjacent said first end thereof; and
    a band device including a flexible band under tension, said band having a flat face, and said band device having means for maintaining said band under tension, said band extending around a portion of said first tubing section and through said apertures in said second tubing section and disposed in face-to-face relationship with a portion of said first tubing section and with said tongues of said second tubing section;
    whereby said band is supported on said curved tongues and said first tubing section is drawn and held into frictional engagement with said first end of said section to form a stable structural tubing juncture.

2. A tubing juncture according to claim 1, in which said first tubing section is disposed and extends substantially at right angles to the said second tubing section.

3. A tubing juncture according to claim 2, said juncture including a member secured to the exterior surface of said first tubing section and engaging the inner surface of said second tubing section, whereby to inhibit rotation of said second tubing section relative to said first tubing section.

4. A tubing juncture according to claim 2, in which said first end of said second tubing section is shaped to fit the curved exterior surface of said first tubing section.

5. A tubing juncture according to claim 2, said junction comprising a third tubing section having adjacent a first end thereof first and second inwardly-lanced and displaced portions forming inwardly-extending integral curved tongues and first and second apertures similar to said first end of said second tubing junction, and in which said third tubing section is longitudinally aligned with said second tubing section, said band extending through said apertures in said third tubing section,
    whereby said first, second, and third tubing sections are united in a stable structural juncture.

6. A tubing juncture according to claim 2, said junction comprising a third tubing section having adjacent a first end thereof first and second inwardly lanced and displaced portions forming inwardly-extending integral tongues and first and second apertures similar to said first end of said second tubing section, said third tubing section extending at right angles to said first and second tubing sections, and said band extending through said apertures in said third tubing section, whereby paid first, second, and third tubing sections are united in a stable structural juncture.

7. A tubing juncture according to claim 1, in which said first tubing section has first and second ends and has adjacent said first end first and second inwardly lanced and displaced portions forming inwardly-extending integral tongues the inward displacement of which provides respective first and second apertures in said first tubing section adjacent said first end thereof, and in which juncture said first and second tubing sections are longitudinally aligned, and in which juncture said band extends through said first and second apertures in said first tubing section and is supported on said tongue-like portions thereof.

8. A tubing juncture according to claim 7, in which juncture a portion of the first end of said first tubing section is telescoped into the said first end of said second tubing section.

9. A tubing juncture according to claim 7, in which juncture said first end of said first tubing section butts against the said first end of said second tubing section.

10. A tubing juncture according to claim 9, including a member disposed in part in said first end of said first tubing section and in part in said first end of said second tubing section and in engagement with the interiors of both of said first ends, whereby to reinforce said juncture.

11. A tubing juncture according to claim 1, in which juncture one of said first and second tubing sections is of electrically insulative material.

12. A tubing juncture according to claim 11, including in said juncture within said tubing section of electrically insulative material a reinforcing member adapted to resist crushing deformation of said tubing section of electrically insulative material.

13. A method of providing a structural juncture of a first member having a generally hollow cylindrical portion and a second member, said method comprising:
    providing at a first end of said first member one or more surfaces of shape complementary to respective portions of the surface of said second member at the region at which the juncture is to be made;
    providing adjacent said end of said first member at generally opposite sides thereof first and second opposed openings which provide a continuous unobstructed path through said first member, providing said first member between said openings with respective inwardly-extending tongues each having a wide curved surface and each extending toward the other and each adapted and arranged to form a seat for a respective portion of a wide flat flexible band, and forming said wide curved surfaces of said first member to merge smoothly and contiguously with the exterior surface of said first member at one extremity of each respective one of said openings and in a direction toward said first end of said first member adjacent said first end of said first member; and
    extending a flexible wide flat band member through said openings and first member and around a portion of the second member at said region and drawing taut such band to bring the complementary surfaces of the end of said first member and said second member into strong compressional frictional engagement to provide a useful structural juncture.

References Cited
UNITED STATES PATENTS

| | | | |
|---|---|---|---|
| 1,238,316 | 8/1917 | Macmechen et al. | 287—189.36 |
| 2,630,334 | 3/1953 | Ewers | 248—231 |
| 2,740,431 | 4/1956 | Hargreaves | 24—274 |
| 2,764,438 | 9/1956 | Haviland. | |
| 3,381,331 | 5/1968 | Reynolds | 16—42 |
| 944,643 | 12/1909 | White | 287—125 |
| 1,537,529 | 5/1925 | Enberg | 306—32 XR |

FOREIGN PATENTS

| | | |
|---|---|---|
| 49,938 | 6/1939 | France. |
| 845,533 | 8/1960 | Great Britain. |

DAVID J. WILLIAMOWSKY, Primary Examiner

A. V. KUNDRAT, Assistant Examiner

U.S. Cl. X.R.

248—231